United States Patent
Göthlin et al.

(10) Patent No.: US 11,904,660 B2
(45) Date of Patent: Feb. 20, 2024

(54) AIR VENT INCLUDING MESH PANEL WITH IMPROVED DIRECTIVITY

(71) Applicant: Volvo Car Corporation, Gothenburg (SE)

(72) Inventors: Jonas Göthlin, Torslanda (SE); Eric Gunnarsson Hörnsten, Västra Frölunda (SE)

(73) Assignee: Volvo Car Corporation, Gothenburg (SE)

( * ) Notice: Subject to any disclaimer, the term of this patent is extended or adjusted under 35 U.S.C. 154(b) by 342 days.

(21) Appl. No.: 16/840,505

(22) Filed: Apr. 6, 2020

(65) Prior Publication Data

US 2020/0324625 A1    Oct. 15, 2020

(30) Foreign Application Priority Data

Apr. 9, 2019 (EP) ..................................... 19168161

(51) Int. Cl.
*B60H 1/34* (2006.01)

(52) U.S. Cl.
CPC .................................. *B60H 1/3414* (2013.01)

(58) Field of Classification Search
CPC .......... B60H 1/3414; B60H 2001/3492; B60H 2001/3421
USPC ....................................................... 454/152
See application file for complete search history.

(56) References Cited

U.S. PATENT DOCUMENTS

| | | | |
|---|---|---|---|
| 2006/0201077 A1 | 9/2006 | Kamano et al. | |
| 2007/0129001 A1* | 6/2007 | Orr | F24F 11/0001 454/239 |
| 2010/0011799 A1 | 1/2010 | Sakakibara | |
| 2014/0357179 A1 | 12/2014 | Londiche et al. | |
| 2016/0152116 A1* | 6/2016 | Albin | B60H 1/3421 454/155 |
| 2016/0288625 A1 | 10/2016 | Uhlenbusch et al. | |
| 2020/0290432 A1* | 9/2020 | Stehle | B60H 1/3421 |

FOREIGN PATENT DOCUMENTS

| | | | |
|---|---|---|---|
| CN | 1451922 A | 10/2003 | |
| CN | 1831444 A | 9/2006 | |
| CN | 101213101 A | 7/2008 | |
| CN | 108705919 A | 10/2018 | |
| DE | 19807259 A1 * | 8/1999 | ........... B60H 1/3407 |

(Continued)

OTHER PUBLICATIONS

English Translation of DE 10 2017 111 011 A1 (Year: 2017).*

(Continued)

*Primary Examiner* — Steven B McAllister
*Assistant Examiner* — Charles R Brawner
(74) *Attorney, Agent, or Firm* — Clements Bernard Walker; Christopher L. Bernard

(57) ABSTRACT

Air vent including mesh panel with improved directivity. In general, the disclosed subject matter relates to an air vent which comprises a mesh panel with vent holes to cover an outlet of the air vent, wherein the air vent provides for improved directionality of the outlet air through the mesh panel. The improvement in directivity is provided by that the air flowing towards the mesh panel is directed to flow substantially perpendicular to the mesh panel in at least some direction modes of the air redirecting element.

9 Claims, 6 Drawing Sheets

(56) References Cited

FOREIGN PATENT DOCUMENTS

| | | | | |
|---|---|---|---|---|
| DE | 202005001176 U1 | 5/2005 | | |
| DE | 202015104334 U1 | 10/2015 | | |
| DE | 102017111011 A1 * | 7/2017 | ........... | B60H 1/3414 |
| EP | 0703104 A1 | 3/1996 | | |
| GB | 2486949 A * | 7/2012 | .............. | B60H 1/34 |
| JP | 2011156930 A | 8/2011 | | |

OTHER PUBLICATIONS

English Translation of DE 198 07 259 A 1) (Year: 1999).*
Sep. 23, 2019 European Search Report issued on International Application No. 19168161.
Apr. 19, 2023 Office Action Issued in Corresponding CN Application No. 202010263636.0.

* cited by examiner

AIR VENT INCLUDING MESH PANEL WITH IMPROVED DIRECTIVITY

CROSS-REFERENCE TO RELATED APPLICATION

The present disclosure claims the benefit of priority of co-pending European Patent Application No. 19168161.8, filed on Apr. 9, 2019, and entitled "AIR VENT INCLUDING MESH PANEL WITH IMPROVED DIRECTIVITY," the contents of which are incorporated in full by reference herein.

TECHNICAL FIELD

The present disclosure relates to an air vent for a vehicle.

BACKGROUND

Conventional air vents for the automotive industry often employ vanes which are adapted to redirect the air in a direction selected by an occupant of the vehicle. The air vents may be arranged in various locations in the vehicle interior such as in the instrument panel or in the ceiling.

The vanes of the air vent are often visible which means they are subject to be damaged by exterior objects or human interaction. Furthermore, with such an open design, objects may accidently, or intentionally, reach inside the air vent and damage other inner structures of the air vent.

In order to avoid damage to the air vent components, the opening of the air vent may be covered by an air permeable cover. Furthermore, the additional of an air permeable cover may also provide for improved design freedom of the vehicle interior since the cover may be designed according to manufacturer preferences.

However, such air permeable covers inevitably affect the air flow dynamics of the air flowing through the air vent. Thus, the air vent functionality may be compromised by the addition of the cover.

Accordingly, there is a need for improving the functionality of air vents with air permeable covers.

SUMMARY

In general, the disclosed subject matter relates to an air vent which comprises a mesh panel with vent holes to cover an outlet of the air vent, wherein the air vent provides for improved directionality of the outlet air through the mesh panel.

Generally, when an air permeable cover with small holes is arranged to cover the outlet of an air vent, it is difficult to achieve satisfactory directivity, i.e. ability to direct the output air flow in a wide range of directions with sufficient amount of air flow to satisfy user preferences. This is due to that the air flow not easily penetrates through covers with small holes when it hits the cover at an angle.

This was realized by the inventors who propose an air vent which comprises at least one air redirecting element adapted to redirect an air flow flowing towards an outlet of the air vent where a mesh panel with vent holes is arranged to cover the outlet of the air vent. The improvement in directivity is provided by that the air flowing towards the mesh panel is directed to flow substantially perpendicular to the mesh panel in at least some direction modes of the air redirecting element.

The direction modes are related to selected directions in which satisfactory air flow is desirable. Thus, the shape of the mesh and the configuration of the air redirecting elements may be designed with regards to specific use cases and vehicle interior design. However, in at least two direction modes of the air redirecting elements is the air flow directed substantially perpendicular to the mesh panel. The direction modes of the air redirecting elements are distinct from each other.

The mesh panel with vent holes is arranged downstream of at least one air redirecting element to cover the outlet of the air vent. As was realized by the inventors, the at least one air redirecting element and the mesh panel are jointly adapted such that the air flow is redirected by the at least one air redirecting element in a direction substantially perpendicular to at least a portion of the mesh panel with vent holes, in at least two direction modes of the at least one air redirecting element.

Accordingly, the air flow in the proposed air vent is redirected by the air redirecting element to flow normal to the vent holes in at least two directions. This effectively and advantageously leads to a higher flow of air through the air vent compared to when the air flow hits the vent holes at an angle. Further, this leads to that the directivity, i.e. the efficiency in directing the air flow in a desired direction, or in at least two directions, from the air vent, is satisfactory despite the presence of the mesh panel covering the outlet of the air vent.

The mesh panel is advantageously shaped such that the normal of the mesh panel points in preferred directions for the air flow. In other words, the direction of the air flow into the vehicle compartment from the air vent is defined by the normal of the mesh panel at any given point on the mesh panel.

In embodiments, the at least one air redirecting element includes at least one rotatable vane, wherein the rotational orientation of the vane defines the direction mode of the air redirecting element. In other words, a rotatable vane may direct the air flow either directly perpendicular to the mesh panel, or indirectly via a further air redirecting element of a different type.

For example, an air duct leading to the outlet where the mesh panel is arranged, or a static air redirecting members may be included as part in the at least one air redirecting element. This advantageously provides for improving the range of redirecting modes that provide an air flow substantially perpendicular to the mesh panel. In effect, the directivity, i.e. the ability to provide satisfactory air flow in a range of directions from the air vent, may be improved.

In embodiments, the mesh panel are adapted such that the air flow is redirected by the at least one air redirecting element in a direction substantially perpendicular to the at least a portion of the mesh panel vent holes in all redirecting modes of the at least one air redirecting element.

A mesh panel as comprised in the air vent of the present disclosure may also be used for seamlessly cover adjacent devices to provide a clean design and to protect the interior of such devices. For example, an adjacent device may be a loud speaker.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF DRAWINGS

These and other aspects of the present invention will now be described in more detail, with reference to the appended drawings showing example embodiments of the invention, wherein.

DETAILED DESCRIPTION

Figure 1:
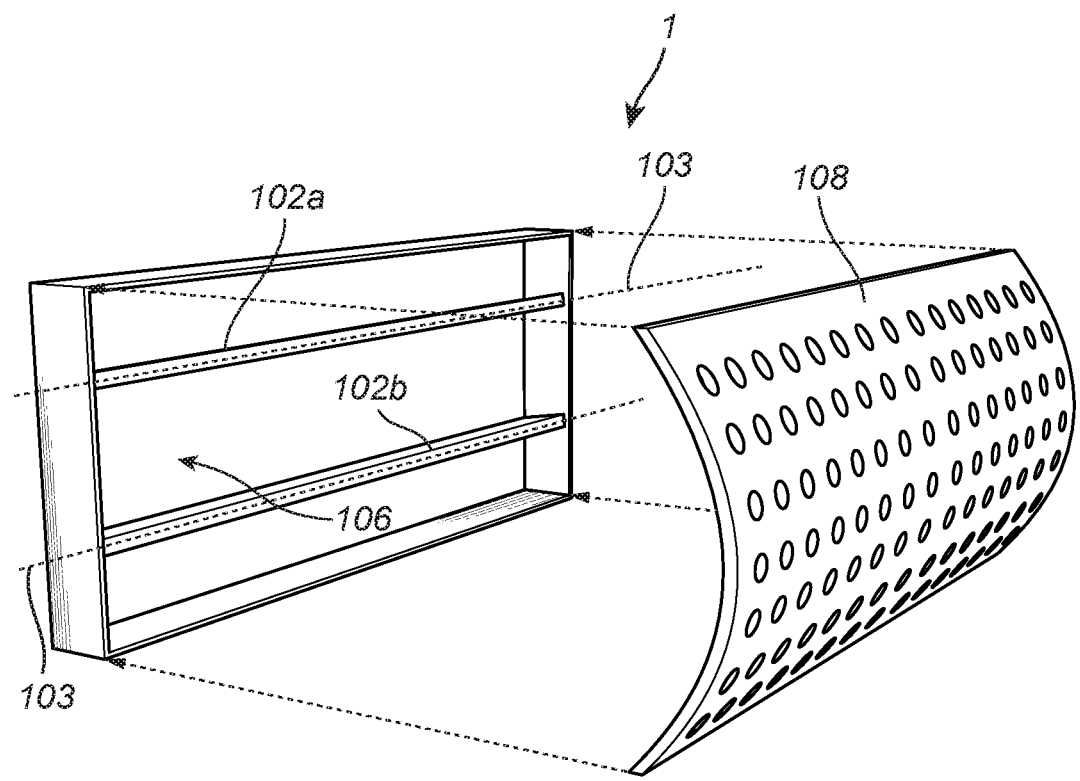
FIG. 1 conceptually illustrates an air vent according to example embodiments of the present disclosure.

In the present detailed description, various embodiments of an air vent according to the present disclosure are described. However, this invention may be embodied in many different forms and should not be construed as limited to the embodiments set forth herein; rather, these embodiments are provided for thoroughness and completeness, and fully convey the scope of the present disclosure to the skilled person. Like reference characters refer to like elements throughout.

FIG. 1 conceptually illustrates is an air vent 1 according to embodiments of the present disclosure. The air vent 1 comprises air redirecting elements in the form of two vanes 102*a-b* which are rotatable about their respective rotation axis 103. A mesh panel 108 with vent holes (not numbered) is arranged to cover the outlet 106 of the air vent 1. When the vanes 102*a-b* are rotated about their respective rotation axis 103 the air flow towards the outlet 106 is redirected before the air exits the air vent 1 through the mesh panel 108 vent holes which covers the outlet 106. Mechanisms for rotating the vanes are known per se and will not be discussed in detail herein. The vanes are sometimes also referred to as louvers or flaps.

Figure 2A:
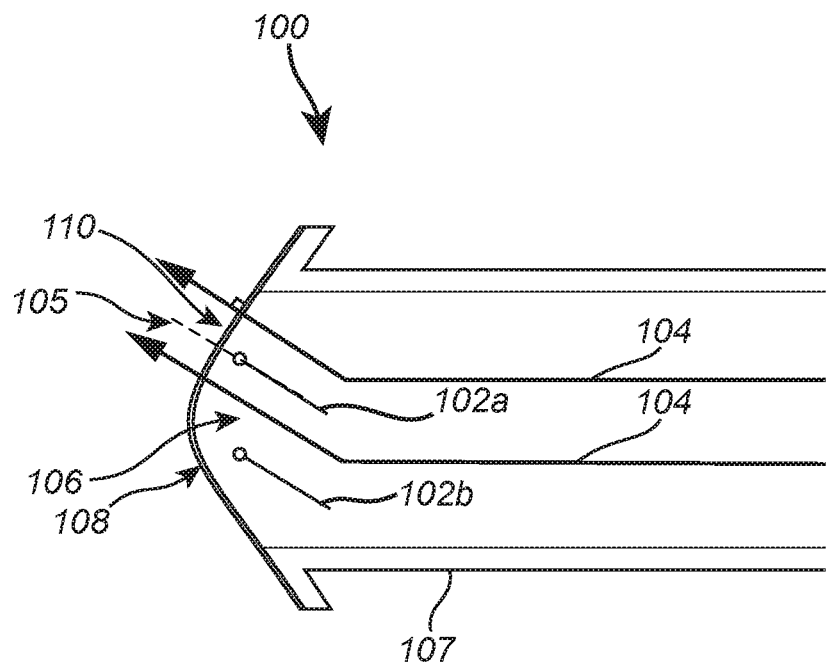
FIG. 2A is a cross-section of an example air vent in a first direction mode of the air redirecting elements.
Figure 2B:
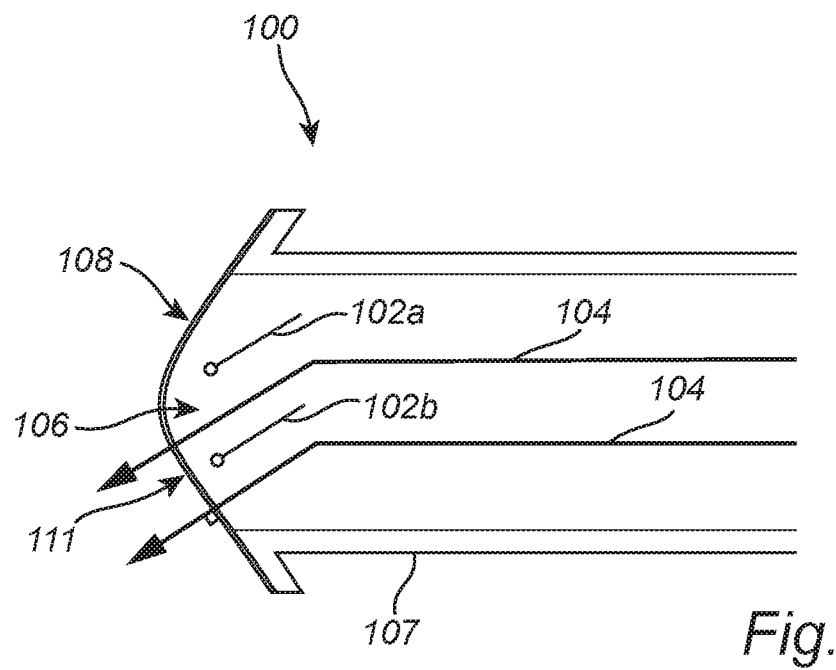
FIG. 2B is a cross-section of the example air vent in FIG. 2A with the air redirecting elements in a second direction mode.

FIG. 2A-B conceptually illustrate a cross-sectional views of an example air vent 100 according to embodiments of the present disclosure. Similar to the air vent described with reference to FIG. 1, the air vent 100 comprises at least one air redirecting element in the form of rotatable vanes 102*a-b* adapted to redirect an air flow 104 flowing towards the outlet 106 of the air vent 100. The air flow 104 originates from upstream of the vanes 102*a-b*, and the outlet 106 is downstream of the vanes 102*a-b*. The air flow 104 is guided by a duct 107 to the vanes 102*a-b*, and leading up to the outlet 106.

The air redirecting elements in the form of rotatable vanes provides a flexible solution for being able to redirect the air flow in a wide range of directions.

A mesh panel 108 with vent holes is arranged downstream of the vanes 102*a-b* to cover the outlet 106 of the air vent. The at least one rotatable vane 102*a-b* and the mesh panel 108 are adapted such that the air flow 104 is redirected by the vanes 102*a-b* in a direction substantially perpendicular to at least a portion of the mesh panel with vent holes in at least two direction modes of the vanes 102*a-b*.

In each of the direction modes may at least one of the vanes be arranged to point along an axis substantially perpendicular to the mesh panel.

Embodiments of the present disclosure are based on the realization that by directing the air flow substantially perpendicular to the mesh panel, an increase in air flow is obtained through the mesh panel in the directions which correspond to being perpendicular to the mesh panel.

FIG. 2A illustrates a first direction mode of the vanes 102*a-b* in which the air flow 104 is directed in a direction substantially perpendicular to a first portion 110 of vent holes in the mesh panel 108. In this exemplary first direction mode, the vanes 102*a-b* are arranged inclined upwards in the drawing, to redirect the air flow 104 towards an upper portion 110 of the mesh panel 108. The vane 102*a* may be arranged to point along an axis 105 substantially perpendicular to the first portion 110 of mesh panel 108.

Further, FIG. 2B illustrates a second direction mode of the vanes 102*a-b* in which the air flow 106 is directed in a direction substantially perpendicular to a second portion 111 of vent holes in the mesh panel 106. In this exemplary second direction mode, the vanes 102*a-b* have been rotated through a rotation angle compared to the orientation of the vanes 102*a-b* in the first direction mode shown in FIG. 2A. In the exemplary second direction mode the vanes 102*a-b* are arranged inclined downwards in the drawing, to redirect the air flow 104 towards a lower portion 111 of the mesh panel 108. The vane 102*b* may be arranged to point along an axis (not shown) substantially perpendicular to the second portion 110 of mesh panel 108, analogously with the description with reference to FIG. 2A.

The air flow direction out from the air vent 100 in the second direction mode is different from the air flow direction out from the air vent 100 in the first direction mode. However, in both the first direction mode and the second direction mode is the air flow perpendicular to the respective portion of mesh holes. As is understood, the rotational orientation of the vane 102*a-b* defines the direction mode in the embodiment shown in FIGS. 2A-B.

Accordingly, by shaping the mesh panel such that directions perpendicular from the mesh panel are in desired air flow directions, for example as illustrated in FIGS. 2A-B and FIG. 3A-B, and by directing the air flow upstream of the mesh panel to be perpendicular to the mesh panel in the desired air output direction, improved directivity of the air vent with a mesh panel is provided.

The inventors have thus realized that in order to provide satisfactory air flow through the mesh panel vent holes, the air flow should preferably be directed in a direction as close as possible to perpendicular to the mesh panel. Accordingly, the inventors realized to design the mesh panel and the air redirecting elements such that the air flow from the air redirecting elements is directed substantially perpendicular to the mesh panel in preferably as many direction modes as possible of the air redirecting elements.

A design procedure for an air vent of the present disclosure may be to firstly determine the desired outflow directions from the air vent, and shape the mesh panel to have normal axis from the vent holes of the mesh panel in the desired outflow directions. The air redirecting elements may thereafter be adapted to redirect an air flow to be perpendicular to the mesh panel in as many direction modes as possible or suitable for the particular mesh panel.

It should be understood that there are many different possibilities for enabling the substantially perpendicular flow to the mesh panel for more than one direction mode of the air redirecting element that are within the scope of the appended claims. Herein, a few selected examples are shown.

The mesh panel 108 in the embodiments described with reference to FIG. 1 and FIGS. 2A-B is a generally curved mesh panel with a convex shape, as seen from outside the air vent 100. The shape of the mesh panel 108, i.e. the normal from the mesh panel, reflects the desired air flow directions out from the air vent.

Figure 3A:
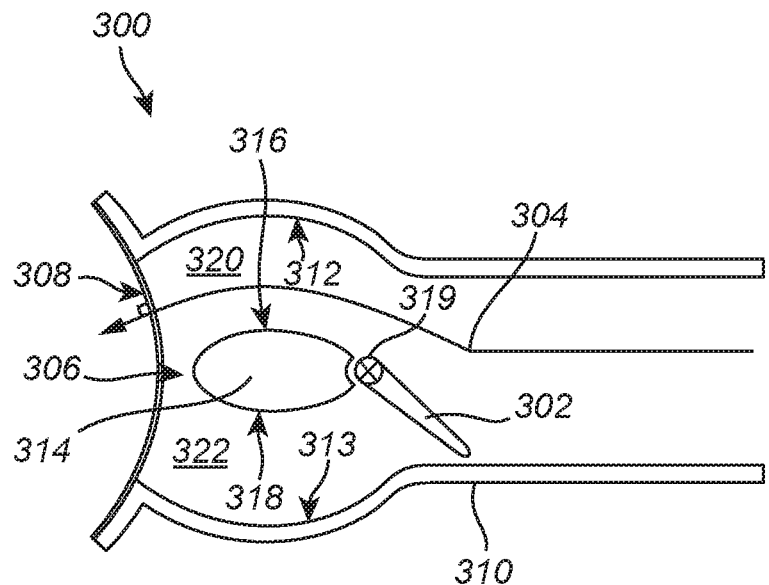
FIG. 3A is a cross-section of an example air vent in a first direction mode of the air redirecting elements.

FIG. 3A illustrates another possible embodiment within the scope of the present disclosure. The air vent 300 in FIG. 3A comprises an air redirecting element in the form of a rotatable vane 302 adapted to redirect an air flow 304 flowing towards an outlet 306 of the air vent 300. The mesh panel 308 with vent holes is arranged downstream of the vane 302 to cover the outlet 306 of the air vent 300.

The air vent 300 further includes an air redirecting element in the form of a static air redirecting member 314 arranged in the duct 310 downstream of the vane 302. The static air redirecting member 314 includes a curved upper surface 316 and a curved lower surface 318 for directing the air flow 304 in the direction substantially perpendicular to the mesh panel 308. The static air redirecting member 314 provides for improved ability to redirect the air flow 304 to a direction perpendicular to the mesh panel 308.

Figure 3B:
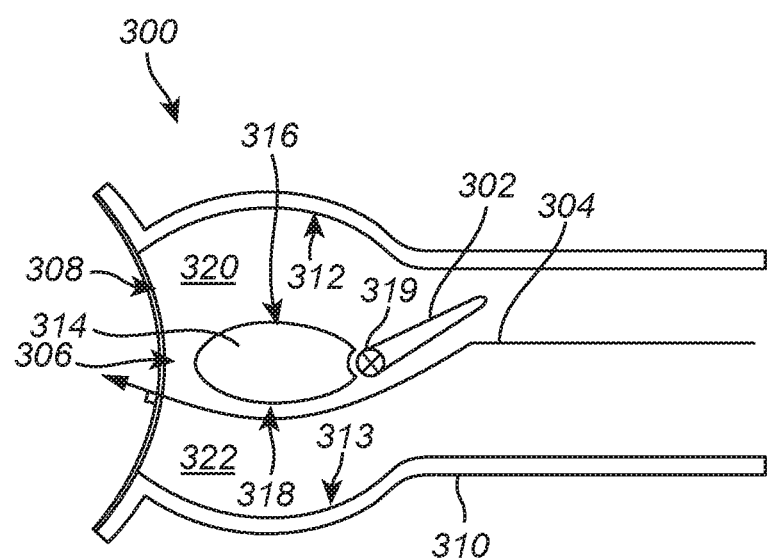
FIG. 3B is a cross-section of the example air vent in FIG. 3A with the air redirecting elements in a second direction mode.

In addition, in order to further improve the directivity of the air vent 300, the air vent 300 shown in FIGS. 3A-B comprises a duct 310 which is shaped to lead the air flow 304 towards the mesh panel 308. The duct includes curved inner portions 312, 313 adapted to direct the airflow 304 in the direction substantially perpendicular to the mesh panel 308 having the vent holes.

Altogether, the rotatable vane 302, the shape of the duct 310 and the shape of the static air redirecting member 314, and the mesh panel 308 are adapted such that the air flow 304 is redirected by the air redirecting elements 302, 314, and 310, in a direction substantially perpendicular to the mesh panel 308 with vent holes in at least two direction modes of the rotatable vane 302.

The static air redirecting element 314 which has curved upper 316 and lower surfaces 318 is arranged downstream of the vane 302. The vane 302 redirects the air flow to flow either past the upper curved surface 316 or past the lower curved surface 318, or a combination thereof depending on the specific direction mode of the vane 302.

The rotatable vane 302 has its rotation axis 319 adjacent to the static air redirecting member 314, with the vane 302 generally pointing in the upstream direction of the air flow 304. This provides for the possibility for the vane 302 to direct the air flow to flow either above or below the static air redirecting member 314 with little or no escape air that flows past the vane 302 without being redirected. The connection between the pivot point 319 of the vane 302 and the static air redirecting member 314 may be air tight.

The static air redirecting member 314 is here only shown in a cross-sectional view. The static air redirecting member 314 preferably extends the entire transverse length of the vane 302, i.e. the transverse direction of the outlet 306, comparable with the general shape of the outlet 106 in FIG. 1.

In the example direction mode of the vane 302 shown in FIG. 3A, the air flow 306 is directed to flow mainly past the upper curved surface 316, i.e. in the upper portion 320 of the duct 310. The shape of the upper curved surface 316 and the curved inner portion 312 of the duct causes the air flow to flow in a direction substantially perpendicular to the mesh panel 308.

If the vane 302 is rotated to another direction mode, as shown in the example direction mode of the vane 302 shown in FIG. 3B, the air flow is directed to flow mainly past the lower curved surface 318, i.e. in the lower portion 322 of the duct 310. The shape of the lower curved surface 318 and the curved inner portion 313 of the duct causes the air flow to flow in a direction substantially perpendicular to the mesh panel 308.

Accordingly, the rotatable vane 302 controls the air flow 304 to flow either in the upper portion 320 or the lower portion 322 of the duct 310. The rotatable vane 302 may therefore also control the distribution of the air flow 304 that enters either one of the upper portion 320 and the lower portion 322. However, due to the configuration of the curved inner portion 312 of the duct and the air redirecting element 314, the air flow 304 is redirected in a direction substantially perpendicular to the at least a portion of the mesh of vent holes, or even the entire mesh panel 308, in all redirecting modes of the rotatable vane 302.

Accordingly, with the introduction of the curved duct and the static air redirecting member, another possibility for improving the directivity of the air flow is presented. With this solution, the air flow through the mesh panel is improved for a wider range of direction modes of the air redirecting element.

The mesh panel 308 shown in FIGS. 3A-B is curved and has a generally concave shape, as seen from outside the air vent 300.

Figure 4A:
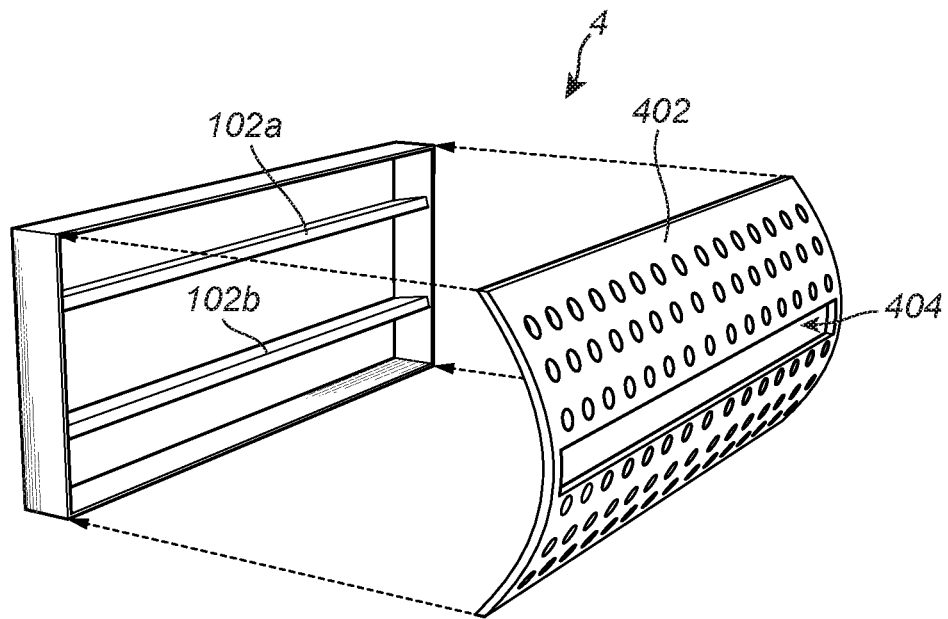
FIG. 4A conceptually illustrates an air vent according to example embodiments of the present disclosure.

FIG. 4A illustrates a further embodiment of the present disclosure. Here, the air vent 4 comprises mesh panel 402 including an elongated opening 404 which interrupts the vent holes. The opening 404 is located along the centre transverse axis of the mesh panel 402, which in this case is shown to be of the convex type also shown in FIG. 1 and FIGS. 2A-B. The opening 404 is for allowing direct air flow to bypass the vent holes in the mesh panel.

With the opening 404 in the centre of the mesh panel, it is possible to increase the air flow through the mesh panel in a portion of the mesh panel where it may be difficult to accomplish an air flow perpendicular to the mesh panel. Accordingly, with the addition of the opening 404 improved air flow in the direction of the opening 404 is provided but to the cost of having a somewhat larger opening than that of the vent holes.

Figure 4B:
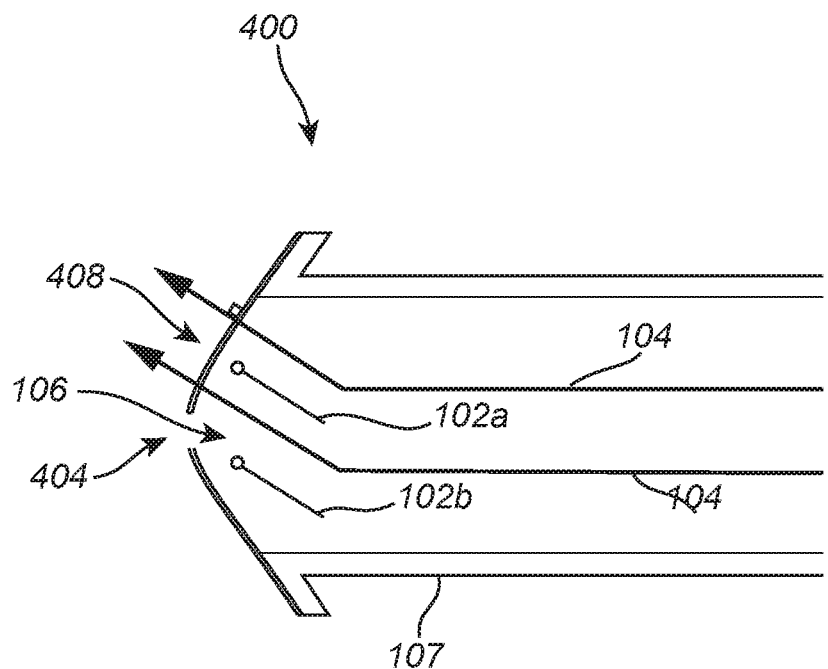
FIG. 4B is a cross-sectional view of an example air vent.

FIG. 4B is a cross-sectional view of an air vent 400 including the mesh panel 404. The difference between the air vent shown in FIGS. 2A-B and the one shown in FIGS. 4A-B is that the mesh panel 402 here includes the opening 404. The opening 404 allows for the air flow to more easily flow through the mesh panel and into the vehicle interior at the centre portion of the mesh panel 402, where it may in some cases be difficult to achieve a perpendicular flow direction to the mesh panel. By opening the centre of the mesh panel 402 further facilitates for the vanes 102a-b to redirect the air flow in a direction substantially perpendicular to the mesh of vent holes in all redirecting modes of the vanes 102a-b.

The opening may extend across the entire transverse length of the mesh panel, or only across a portion of the entire transverse length. The dimensions of the opening 404 is here shown only for exemplifying purposes. The size and shape of the opening 404 may be designed according to specific design cases.

The mesh panels may be provided in different forms and with different shapes and patterns of the vent holes, some of which will be described next.

Figure 5:
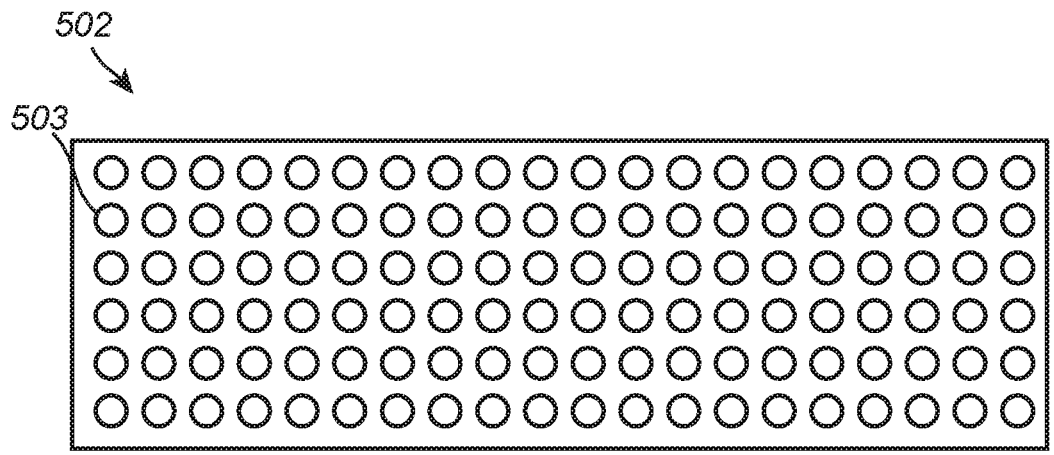
FIG. 5 conceptually illustrates an example mesh panel.

FIG. 5 conceptually illustrates one possible configuration of mesh vent holes 503 of a mesh panel 502. The vent holes 503 are here shown as circular vent holes arranged in a regular square pattern. However, any other pattern such as rectangular, or circular, or irregular patterns are also possible.

Figure 6:
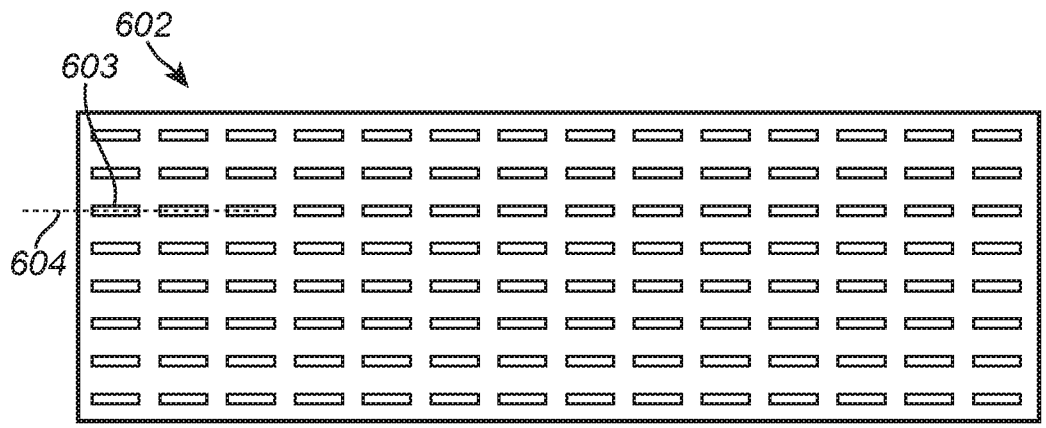
FIG. 6 conceptually illustrates another example mesh panel.

FIG. 6 conceptually illustrates another mesh panel 602. This mesh panel 602 includes vent holes 603 which are rectangular with the longitudinal axis 604 of the holes in a transverse direction of the mesh panel. The longitudinal axis 604 is preferable aligned with a generally horizontal axis when the mesh is installed in a vehicle. In other words, the width is larger than the height of the vent holes 603. With this type of vent hole 603, the sideways directivity is improved, e.g. the air spreads more easily in the transverse direction along the longitudinal axis 604 (e.g. horizontally). In the mesh panel 602 shown in FIG. 6, the elongated holes 603 are arranged in columns and rows, similar to the circular vent holes in FIG. 5.

Figure 7:
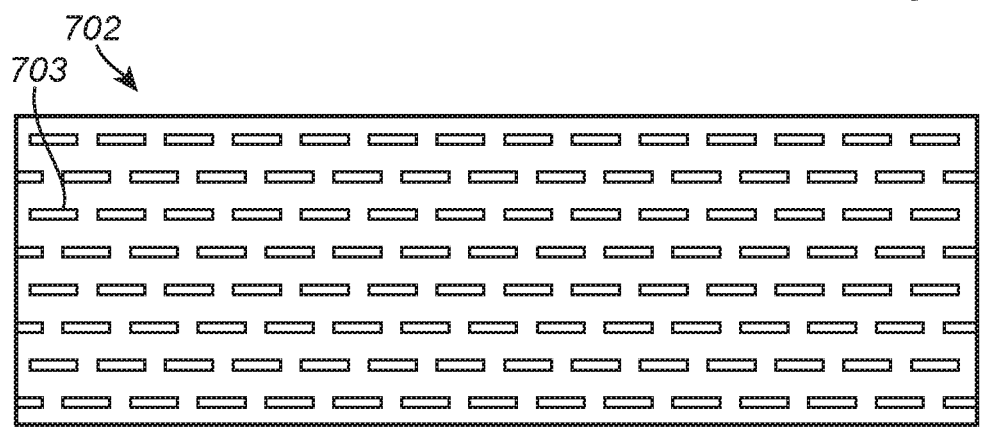
FIG. 7 conceptually illustrates yet another example mesh panel.

Turning instead to FIG. 7 which conceptually illustrates a mesh panel 702 which includes elongated vent holes 703 similar to the vent holes 603 in FIG. 6. However, the vent holes 703 are arranged in a pattern where neighbouring rows of vent holes are misaligned with respect to each other.

Figure 8:
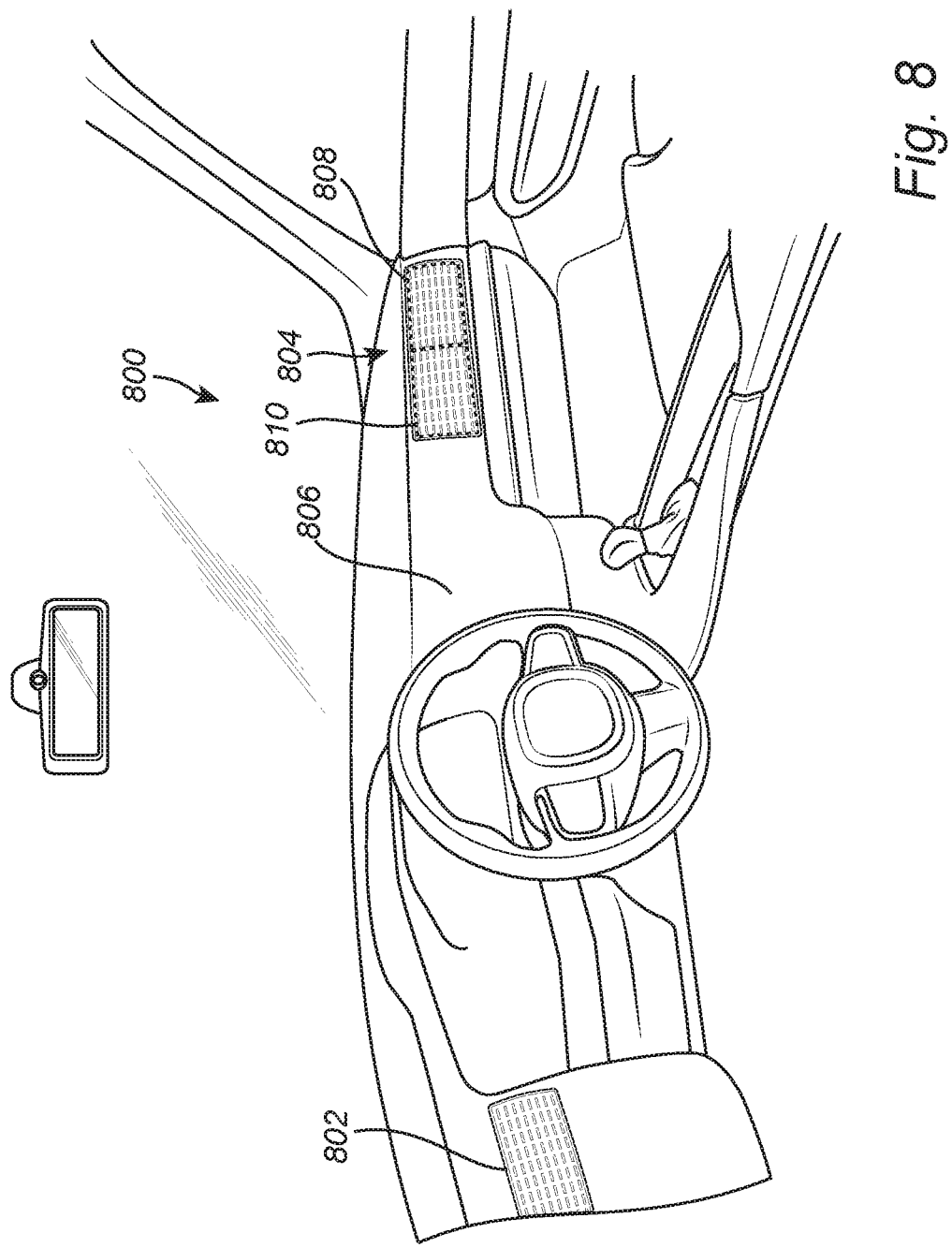
FIG. 8 conceptually illustrates a vehicle interior comprising air vents according to example embodiments of the present disclosure.

FIG. 8 conceptually illustrates a vehicle interior 800 comprising two air vents 802 and 804. The vehicle interior 800 includes an interior panel 806 in which the air vents 802 and 804 are integrated.

The vehicle interior 800 includes a further device 808 arranged adjacent to the outlet 810 of the air vent 802. The mesh 812 of the air vent 804 is arranged to cover the outlet of the further device. This creates a seamless integration of the further device 808 behind the same mesh panel as the air vent.

The mesh panels described herein may be made from various materials. Preferably, the mesh panel is made from a rigid material and for the sake of completeness, some example materials include, a metal, or a plastic, or a carbon composite. The mesh panel may be manufactured by various techniques, including but not limited to etching, punching or moulding.

The person skilled in the art realizes that the present invention by no means is limited to the preferred embodiments described above. On the contrary, many modifications and variations are possible within the scope of the appended claims.

For example, further configurations of air redirecting elements which direct an air flow perpendicular to a curved mesh panel is possible and within the scope of the appended claims. In addition, further types of mesh panels with various types of shaped vent holes and patterns are possible, and the ones disclose herein merely serve as examples.

Furthermore, the vanes are illustrated herein with example shapes that are purely exemplary and various shapes are within the scope of the claims. The general function of the vanes is to divert the air flow in a certain direction depending on the angular orientation of the vane. Generally, the vanes are relatively planar although other possible shapes are possible. In cases where there is more than one vane, the vanes preferably rotate at the same time, synchronized.

In addition, the size of the vent holes are herein exemplified for clarity in the drawings. The size of the vent holes may in practical applications be different than the illustrated examples. For example, the holes may have dimensions in the order or e.g. 1 mm, 2 mm, 3 mm, 4 mm. One example is a vent hole with height 1 mm and width 3 mm.

The density of the vent holes in the mesh panel may vary depending on the specific implementation and size of the mesh holes. Generally, for a given size of vent holes, a higher density provides a more intense air flow. The distance between the vent holes may be comparable to a dimension of the vent holes.

The mesh panel may be relatively thin, e.g. a sheet of the selected material for the mesh panel, in the preferred shape.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

Various examples have been described. These and other examples are within the scope of the following claims.

The invention claimed is:

1. An air vent comprising:
    at least one air redirecting element adapted to redirect an air flow flowing towards an outlet of the air vent; and
    a mesh panel with vent holes arranged downstream of the at least one air redirecting element to cover the outlet of the air vent, wherein the at least one air redirecting element and the mesh panel are adapted such that the air flow is redirected by the at least one air redirecting element in a direction substantially perpendicular to at least a portion of the mesh panel and normal to a portion of the vent holes in all direction modes of the at least one air redirecting element, wherein the at least one air redirecting element includes at least one rotatable vane having a rotation axis that is spaced apart from the mesh panel, wherein a rotational orientation of the vane defines the direction mode of the at least one air redirecting element;
    wherein the vane is arranged in a duct leading the air flow towards the mesh panel, wherein the duct includes a curved inner portion as part of the at least one air redirecting element adapted to direct the airflow in the direction substantially perpendicular to the mesh of holes; and
    wherein the at least one air redirecting element includes a static air redirecting member arranged in the duct downstream of the vane, the static air redirecting member includes a curved upper surface and a curve lower surface for directing the air flow in the direction substantially perpendicular to the mesh of holes.

2. The air vent according to claim 1, wherein the mesh panel is made from a rigid material, such as a metal, or a plastic, or a carbon composite.

3. The air vent according to claim 1, wherein the mesh has a curved shape.

4. The air vent according to claim 1, wherein the holes in the mesh are elongated holes.

5. The air vent according to claim 1, wherein the mesh is arranged to seamlessly cover an outlet of a further device arranged adjacent to the outlet of the air vent.

6. A vehicle interior assembly comprising the air vent according to claim 1, and an interior panel, wherein the air vent is integrated in the interior panel.

7. The vehicle interior assembly according to claim 6, comprising a further device comprising an outlet arranged adjacent to the outlet of the air vent, wherein the mesh is arranged to cover the outlet of the further device.

8. The vehicle interior assembly according to claim 7, wherein the further device is a speaker.

9. A vehicle comprising the air vent according to claim 1.

* * * * *